United States Patent
Palmeto et al.

(10) Patent No.: US 10,646,073 B2
(45) Date of Patent: May 12, 2020

(54) TOASTER AND METHOD FOR CONTROLLING SAID TOASTER

(71) Applicant: Whirlpool EMEA S.p.A., Pero (MI) (IT)

(72) Inventors: Stefano Palmeto, Fabriano (IT); Marcello Riderelli Belli, Osimo (IT); Francesco Giardini, Fabriano (IT); Fortunato Nocera, Fabriano (IT)

(73) Assignee: Whirlpool EMEA S.P.A., Pero (MI) (IT)

( * ) Notice: Subject to any disclaimer, the term of this patent is extended or adjusted under 35 U.S.C. 154(b) by 0 days.

(21) Appl. No.: 15/107,618

(22) PCT Filed: Dec. 15, 2014

(86) PCT No.: PCT/IB2014/066911
§ 371 (c)(1),
(2) Date: Jun. 23, 2016

(87) PCT Pub. No.: WO2015/097590
PCT Pub. Date: Jul. 2, 2015

(65) Prior Publication Data
US 2016/0338538 A1 Nov. 24, 2016

(30) Foreign Application Priority Data
Dec. 23, 2013 (IT) .............................. TO2013A1061

(51) Int. Cl.
*A47J 37/08* (2006.01)

(52) U.S. Cl.
CPC ................ *A47J 37/0842* (2013.01)

(58) Field of Classification Search
CPC ...... A47J 37/08; A47J 37/0842; A47J 37/085; A47J 37/0821; A47J 37/0864; A47J 37/0623; A47J 37/0629
USPC .... 99/27, 332, 385, 389, 391; 219/492, 489, 219/506
See application file for complete search history.

(56) References Cited

U.S. PATENT DOCUMENTS

| | | | | |
|---|---|---|---|---|
| 3,051,074 A | * | 8/1962 | Visos | A47J 37/0814 99/329 P |
| 3,129,650 A | * | 4/1964 | Visos | A47J 37/0814 99/329 P |
| 3,585,365 A | * | 6/1971 | Kircher | A47J 37/0807 219/512 |
| 3,636,858 A | * | 1/1972 | Paaskesen | A47J 37/0814 99/329 RT |
| 3,684,860 A | * | 8/1972 | Snyder | F24C 7/087 219/398 |

(Continued)

FOREIGN PATENT DOCUMENTS

EP 0786222 A1 7/1997

*Primary Examiner* — Eric S Stapleton
(74) *Attorney, Agent, or Firm* — Price Heneveld LLP

(57) ABSTRACT

A toaster includes a first heating compartment, in which a food to be heated is positionable and a first heating element associated with the first heating compartment and adapted to heat the food positioned in said at least one heating compartment. The toaster further includes a first detection device for recognizing a thickness the food and generating a corresponding detection signal and a control unit acting upon said first heating element, including executing a heating program as a function of said detection signal.

16 Claims, 3 Drawing Sheets

(56) References Cited

U.S. PATENT DOCUMENTS

| | | | | |
|---|---|---|---|---|
| 3,684,861 A | * | 8/1972 | De Remer | F24C 7/087 219/398 |
| 4,226,176 A | * | 10/1980 | Macchi | A47J 37/0857 198/728 |
| 4,345,145 A | * | 8/1982 | Norwood | A47J 37/0623 219/408 |
| 4,487,115 A | * | 12/1984 | Su | A47J 37/0842 99/327 |
| 4,491,066 A | * | 1/1985 | Juriga | A47J 37/0807 99/391 |
| 4,791,862 A | * | 12/1988 | Hoffmann | A47J 37/0814 99/385 |
| 4,894,518 A | * | 1/1990 | Ishikawa | A47J 37/0635 219/413 |
| 5,088,389 A | * | 2/1992 | Labadia del Fresno | A47J 37/0842 219/492 |
| 5,128,521 A | * | 7/1992 | Lanno | A47J 37/0842 219/492 |
| 5,181,455 A | * | 1/1993 | Masel | A47J 37/0611 219/405 |
| 5,193,439 A | * | 3/1993 | Finesman | A47J 37/0842 219/492 |
| 5,390,588 A | * | 2/1995 | Krasznai | A47J 37/0807 219/405 |
| 5,414,243 A | * | 5/1995 | Snell | A47J 37/0842 219/492 |
| 5,426,280 A | * | 6/1995 | Smith | H05B 6/6441 219/506 |
| 5,590,584 A | * | 1/1997 | Ahn | A47J 37/047 219/521 |
| 5,692,432 A | * | 12/1997 | Hazan | A47J 37/085 219/411 |
| 5,771,780 A | * | 6/1998 | Basora | A47J 37/0842 219/492 |
| 5,802,957 A | * | 9/1998 | Wanat | A47J 37/0842 219/492 |
| 5,802,958 A | * | 9/1998 | Hermansson | A47J 37/0611 99/349 |
| 5,924,355 A | * | 7/1999 | Belknap | A47J 37/0807 219/521 |
| 5,938,959 A | * | 8/1999 | Wang | A47J 37/0623 126/20 |
| 5,948,301 A | * | 9/1999 | Liebermann | A47J 36/2483 219/395 |
| 5,960,702 A | * | 10/1999 | Thiriat | A47J 37/085 219/492 |
| 5,970,851 A | * | 10/1999 | Masel | A47J 37/0611 219/386 |
| D415,924 S | * | 11/1999 | Powel | A47J 37/0623 D7/330 |
| 6,006,656 A | * | 12/1999 | Lulofs | A47J 37/085 219/492 |
| 6,012,380 A | * | 1/2000 | Hermansson | A47J 37/0611 99/337 |
| 6,129,007 A | * | 10/2000 | Chan | A47J 37/0814 219/521 |
| 6,240,834 B1 | * | 6/2001 | Chen | A47J 37/0842 219/521 |
| 6,265,695 B1 | * | 7/2001 | Liebermann | A47J 36/24 219/214 |
| 6,267,044 B1 | * | 7/2001 | Friel, Sr. | A47J 37/0814 219/386 |
| 6,279,466 B1 | * | 8/2001 | Gort-Barten | A47J 37/08 219/386 |
| 6,298,772 B1 | * | 10/2001 | Nguyen | A47J 37/08 219/492 |
| 6,326,596 B1 | * | 12/2001 | O'Leary | G05D 23/1951 219/489 |
| 6,341,554 B2 | * | 1/2002 | Thiriat | A47J 37/08 219/492 |
| 6,382,084 B2 | * | 5/2002 | Chan | A47J 37/0814 219/386 |
| 6,486,451 B1 | * | 11/2002 | Nguyen | A47J 37/0814 219/386 |
| D470,355 S | * | 2/2003 | Xie | A47J 37/0623 D7/330 |
| D470,709 S | * | 2/2003 | Starr | A47J 37/0623 D7/330 |
| 6,530,309 B2 | * | 3/2003 | Van Der Meer | A47J 37/0807 219/492 |
| 6,543,337 B1 | * | 4/2003 | Brown | A47J 37/085 219/492 |
| 6,546,844 B1 | * | 4/2003 | Trevino | A47J 37/0807 99/327 |
| 6,571,687 B1 | * | 6/2003 | Wu | A47J 37/0842 219/413 |
| 6,581,512 B1 | * | 6/2003 | Mauffrey | A47J 37/0878 99/329 P |
| 6,655,262 B2 | * | 12/2003 | Arnedo | A47J 37/0814 219/492 |
| 6,675,700 B2 | * | 1/2004 | Hong | A47J 37/0857 219/492 |
| 6,708,602 B2 | * | 3/2004 | Nguyen | A47J 37/08 99/329 P |
| 6,730,888 B1 | * | 5/2004 | Battu | A47J 37/085 219/502 |
| 6,753,510 B2 | * | 6/2004 | Lile | A47J 37/0842 219/398 |
| 6,786,133 B1 | * | 9/2004 | Cheng | A47J 31/4407 99/280 |
| 6,868,775 B2 | * | 3/2005 | Chen | A47J 37/0842 99/327 |
| 6,903,312 B2 | * | 6/2005 | Miura | B62J 33/00 219/202 |
| 6,946,630 B2 | * | 9/2005 | Lee | H05B 6/6435 219/506 |
| 7,030,350 B2 | * | 4/2006 | Kang | A47J 37/08 219/678 |
| 7,067,777 B2 | * | 6/2006 | Lee | A47J 37/0842 219/680 |
| D524,089 S | * | 7/2006 | Boyle | A47J 37/0623 D7/330 |
| D525,817 S | * | 8/2006 | Brown | A47J 37/085 D7/330 |
| 7,132,633 B2 | * | 11/2006 | Lee | A47J 37/0842 219/680 |
| 7,164,106 B2 | * | 1/2007 | Yu | A47J 37/085 219/685 |
| 7,351,939 B2 | * | 4/2008 | Boyle | A47J 37/0857 219/386 |
| 7,481,153 B2 | * | 1/2009 | Barnes | A47J 37/0821 219/521 |
| 7,856,924 B1 | * | 12/2010 | Stihi | A47J 37/0704 126/25 A |
| 8,227,002 B2 | * | 7/2012 | Douglas | A47J 37/085 219/412 |
| 8,336,449 B2 | * | 12/2012 | Brady | A47J 37/0814 99/327 |
| 8,631,739 B2 | * | 1/2014 | Reischmann | A47J 37/0676 99/444 |
| 8,720,323 B2 | * | 5/2014 | Douglas | A47J 37/085 219/411 |
| 2001/0016222 A1 | * | 8/2001 | Tomsich | A47J 37/08 426/523 |
| 2002/0073851 A1 | * | 6/2002 | Chung | A47J 37/0814 99/327 |
| 2007/0108988 A1 | * | 5/2007 | Konno | G01R 31/2825 324/529 |
| 2008/0203085 A1 | * | 8/2008 | Hensel | A47J 37/085 219/492 |
| 2010/0175562 A1 | * | 7/2010 | Brady | A47J 37/0814 99/332 |

* cited by examiner

TOASTER AND METHOD FOR CONTROLLING SAID TOASTER

BACKGROUND

The present invention relates to a toaster and to a method for controlling said toaster.

As is known, a toaster includes one or more heating compartments, into which foods to be heated are inserted. Said foods may comprise, for example, one or more slices of bread; in case of two slices of bread, other foods can be placed in between, such as, for example, sliced salami and ham, cheese, vegetables, etc.

A toaster is also known which additionally comprises one or more grids for centering the food within said heating compartments. Heating elements are also associated with the heating compartments, typically consisting of electric resistors that, when run by electric current, transfer heat to the foods inserted in the heating compartments.

In some cases accessory pliers can be used, which facilitate the insertion and extraction of the foods from the heating compartments.

Known toasters make available to the user one or more heating programs, each one characterized by a respective time duration. By means of a suitable selector, the user can choose the preferred program as a function of the type of food to be heated.

Known toasters, however, may not be able to ensure optimal results for some food categories, such as, for example, toasts. For example, by selecting short programs one can obtain a satisfactory browning of the outer surface of the toast, but the inside will not be heated appropriately. Conversely, by selecting longer programs, the inside of the toast will be heated appropriately, but the outer surfaces will get too hot or may even burn.

SUMMARY

The Applicant has found that the above-described problems with existing toasters is at least partially due to the fact that, in short programs, the heat is not allowed sufficient time to penetrate the innermost layers of the toast, which will not get sufficiently hot.

Accordingly, by setting a heating program including a suitable series of activations/deactivations of the heating means, the heat can be allowed to reach also the innermost layers of the food so as to reduce the above-described undesired effects, such as burning, on the outermost surfaces.

The Applicant has also found that, for the purpose of optimizing the operation of the toaster and hence the heating of the food positioned in the heating compartments, it would be desirable that the toaster itself could automatically activate the most appropriate heating programs without requiring the user's intervention. Accordingly, in an aspect of the disclosure a toaster is equipped with at least one heating compartment and at least one heating element associated with said heating compartment, at least one detection device for recognizing a thickness of said at least one food and generating a corresponding detection signal, as well as a control unit, acting upon said at least one heating element and configured for executing a heating program as a function of said detection signal.

According to an aspect of the disclosure, a toaster includes a first heating compartment, in which a food to be heated is positionable and a first heating element associated with the first heating compartment and adapted to heat the food positioned in said at least one heating compartment. The toaster further includes a first detection device for recognizing a thickness of the food and generating a corresponding detection signal and a control unit acting upon said first heating element, including executing a heating program as a function of said detection signal.

According to another aspect of the disclosure, a method for controlling a toaster includes recognizing a thickness of at least one food, generating a detection signal according to said thickness, and executing a heating program as a function of said detection signal.

According to another aspect of the disclosure, a toaster includes a first heating compartment, in which a food to be heated is positionable and a first positioning structure acting upon the food in order to position the same in the first heating compartment. The toaster further includes a first heating element associated with said at least one heating compartment and adapted to heat the food positioned in said at least one heating compartment and a first detection device that cooperates with the first positioning structure in order to recognize the thickness of the food and generates a corresponding detection signal. A control unit acts upon said first heating element, including by executing a heating program as a function of said detection signal.

According to another aspect, the disclosure relates to a method for controlling a toaster, said method comprising the recognition of a thickness of at least one food, and the execution of a heating program as a function of said thickness.

This may allow for an optimal selection of the mode in which the heat will be transferred to the food.

Said toaster may comprise at least one positioning structure acting upon said at least one food for positioning the same in said at least one heating compartment.

Said detection device may cooperate with at least one positioning structure in order to recognize said at least one thickness.

Said detection device may be configured for recognizing said at least one thickness as a function of a displacement of said at least one positioning structure.

Said at least one positioning structure may comprise a pair of grids respectively acting upon opposite sides of a respective food.

Said toaster may comprise at least one stem having a first end constrained to a respective one of said grids, and a second end opposite to said first end, said detection device being configured for determining said at least one thickness as a function of a displacement of said second end.

Said detection device may comprise a sensing element which can be switched between a first and a second operating condition, said sensing element being in the first operating condition when it is not in contact with the second end of said stem, said sensing element being switched into the second operating condition when the second end of said stem exerts a certain pressure on said sensing element.

Said detection device may generate said detection signal when said sensing element is switched into the second operating condition.

When said sensing element is switched into the second operating condition, said control unit may act upon said at least one heating element in order to execute a main heating program comprising a succession of activations separated by respective deactivations of said at least one heating element.

When said sensing element is in the first operating condition, said control unit may act upon said at least one heating element in order to execute a heating program in which said at least one heating element is kept active for substantially the whole duration of the program.

Said detection device may comprise a sensing element cooperating with the second end of said stem, so that said detection signal will vary as a function of the position of said second end.

Said sensing element may be configured for detecting the position of said second end with substantial spatial continuity within a predetermined stroke.

Said detection signal may be representative of the position of said second end within said predetermined stroke.

Said control unit may be configured for selecting, among a plurality of preset programs, one heating program to be executed as a function of said detection signal.

Said plurality of programs may comprise:

a. a first group of heating programs, in each one of which said at least one heating element is activated with substantial continuity for the whole duration of the program;

b. a second group of heating programs, each one of which performing a plurality of activations, separated by respective deactivations, of said at least one heating element during the execution of the program.

BRIEF DESCRIPTION OF THE DRAWINGS

Further features and advantages will become more apparent from the following description of a preferred and non-limiting embodiment of the invention. Said description will refer to the annexed drawings, also provided merely as explanatory and non-limiting examples, wherein.

The drawings show different aspects and embodiments of the present invention and, where appropriate, similar structures, components, materials and/or elements are designated in the various drawings by the same reference numerals.

DETAILED DESCRIPTION OF THE INVENTION

Figure 1:
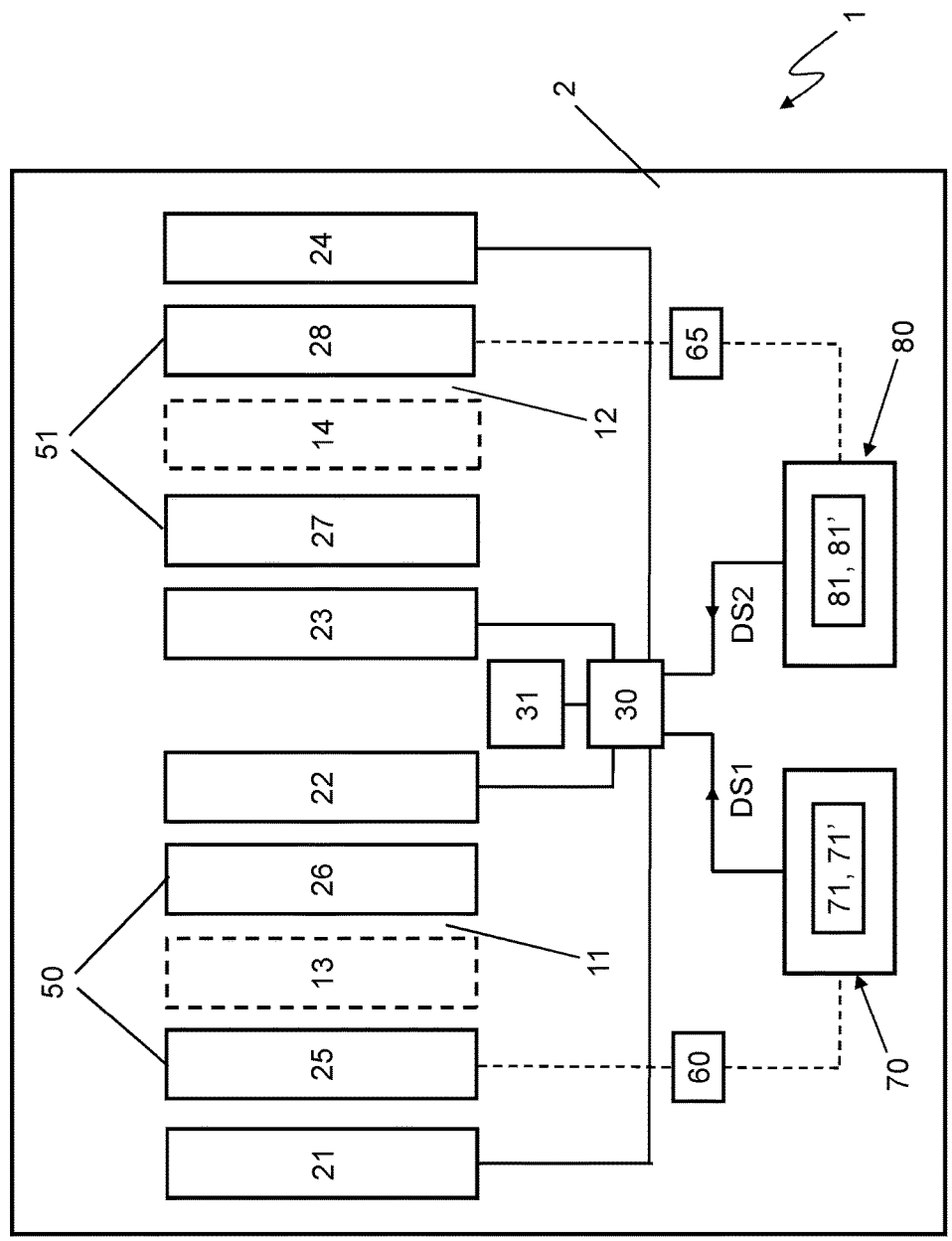
FIG. 1 schematically shows a block diagram of a toaster in accordance with the present invention.

With reference to the annexed drawings, reference numeral 1 designates as a whole a toaster in accordance with the present invention.

The toaster 1 comprises, first of all, a heating compartment 11, 12, into which the food 13, 14 to be heated is positioned.

In the illustrated embodiment, the toaster 1 comprises two heating compartments 11, 12, each one adapted to receive a respective food 13, 14.

The food 13, 14 may comprise, by way of example, slices of bread, toasts, sandwiches, etc.

Each one of the compartments 11, 12 may have a substantially parallelpiped shape, i.e. a shape suitable for housing, with some clearance allowing comfortable insertion and extraction, a slice of bread or a couple of slices of bread between which at least one other food is interposed (toast/sandwich).

The toaster 1 further comprises at least one heating element 21-24, associated with the at least one heating compartment 11, 12 and adapted to heat the food 13, 14 contained in said at least one compartment.

For the purpose of positioning the food 13, 14 correctly, each heating compartment 11, 12 can be conveniently associated with a respective positioning structure 50, 51. Each positioning structure 50, 51 may comprise a pair of grids 25, 26; 27, 28, also referred to as "centering grids". The positioning structure 50, 51 is movable relative to the frame 2 of the toaster 1, in order to allow the food 13, 14 to be properly centered within the respective heating compartment 11, 12.

In an embodiment, each heating compartment 11, 12 is associated with a respective pair of heating elements 21, 22; 23, 24.

Each heating element 21-24 may be integral with the frame 2 of the toaster 1.

Each heating element 21-24 can advantageously be implemented as an electric resistor (e.g. a coil-shaped electric resistor) and positioned on one side of the heating compartment 11, 12. The heating elements 21, 22; 23, 24 of each pair can be located on opposite sides of the respective heating compartment 11, 12, in order to heat both surfaces of the food 13, 14.

When food is to be heated, the at least one heating element 21-24 may be run by a predetermined current, so as to generate the desired heat and transfer it to the food positioned in the respective heating compartment 11, 12.

In accordance with the disclosure, the toaster 1 further comprises at least one detection device 70, 80 in order to recognize a thickness of the at least one food 13, 14 and generate a corresponding detection signal DS1, DS2.

In an embodiment, the toaster 1 comprises a pair of detection devices 70, 80, each one associated with a respective positioning structure 50, 51.

The toaster 1 further comprises a control unit associated with the at least one heating element 21-24 and configured for executing a heating program as a function of the detection signal DS1, DS2.

The detection device 70, 80 may cooperate with the positioning structure 50, 51 in order to recognize said at least one thickness.

In particular, the detection device 70, 80 may be configured for recognizing the thickness of the food 13, 14 as a function of a displacement of the positioning structure 50, 51.

In practice, the detection device 70 recognizes the thickness of the food 13 as a function of the displacement of the positioning structure 50 and generates the corresponding detection signal DS1; likewise, the detection device 80 recognizes the thickness of the food 14 as a function of the displacement of the positioning structure 51 and generates the detection signal DS2.

The control unit 30 then adjusts the operation of the heating elements 21-24 as a function of the signals DS1, DS2.

For example, the operation of the heating elements 21, 22 can be adjusted as a function of the detection signal DS1, and the operation of the heating elements 23, 24 can be adjusted as a function of the detection signal DS2.

In a different embodiment, the detection elements 21-24 are all adjusted in the same manner, which is determined by the control unit 30 on the basis of the two detection signals DS1, DS2.

In an embodiment, the toaster 1 comprises at least one stem 60, 65 having a first end 60a, 65a and a second end 60b, 65b.

The first end 60a, 65a of the stem 60, 65 is constrained to a respective one of the above-mentioned grids 25-28.

The second end 60b, 65b of the stem 60, 65 is used for determining the displacement of the grid, and hence the thickness of the food.

In practice, as schematically shown in FIG. 1, the grid 25 is constrained to the stem 60, and the opposing grid 28 is constrained to the stem 65.

The stem 60, 65 may be substantially integral with the respective grid.

The detection device 70, 80 may, accordingly, be configured for determining the thickness of the food 13, 14 as a function of the displacement of the second end 60b, 65b of the stem 60, 65.

Figure 2:
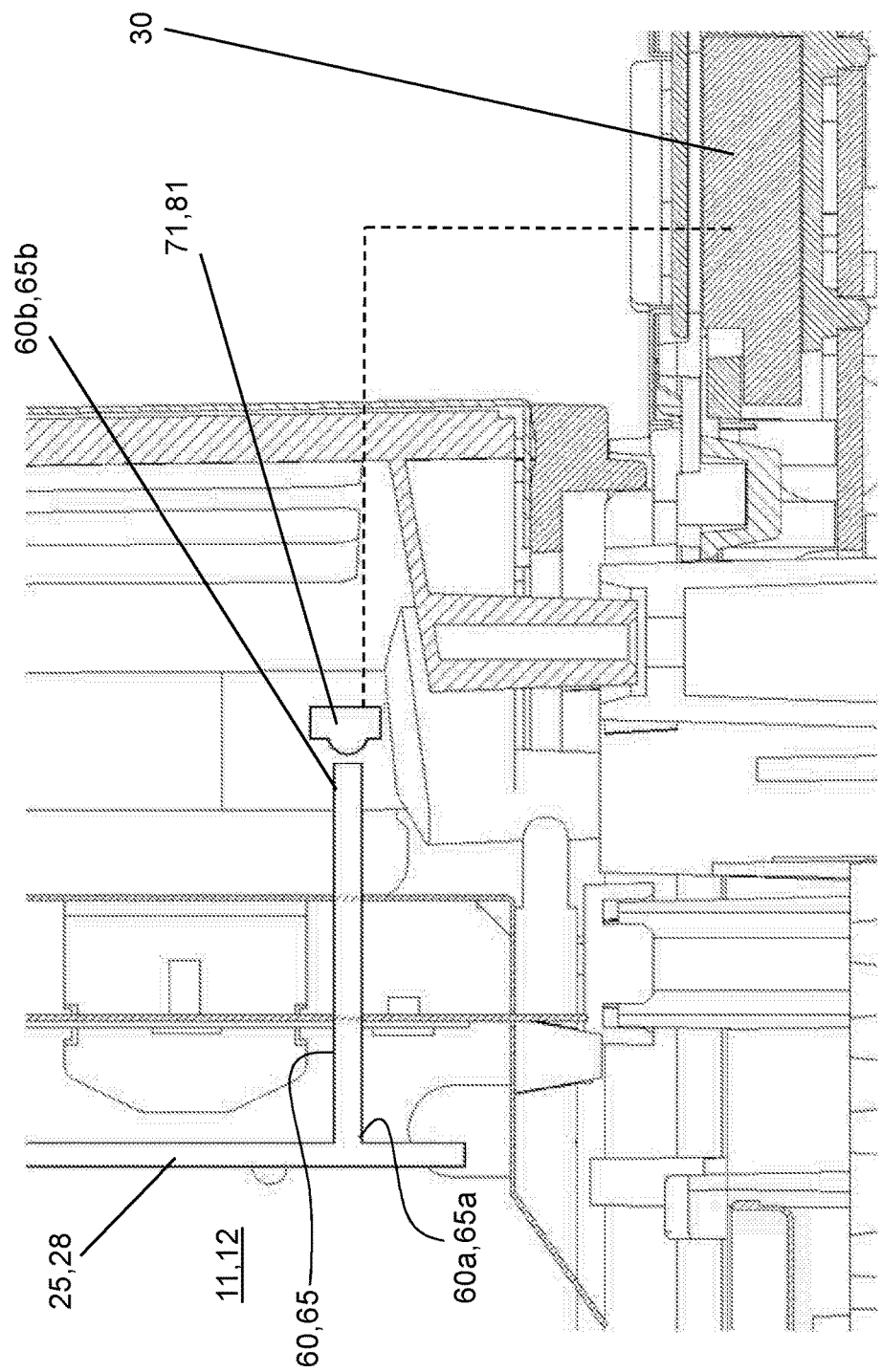
FIG. 2 schematically shows a sectional view of a portion of a first embodiment of a toaster in accordance with the present invention.
Figure 3:
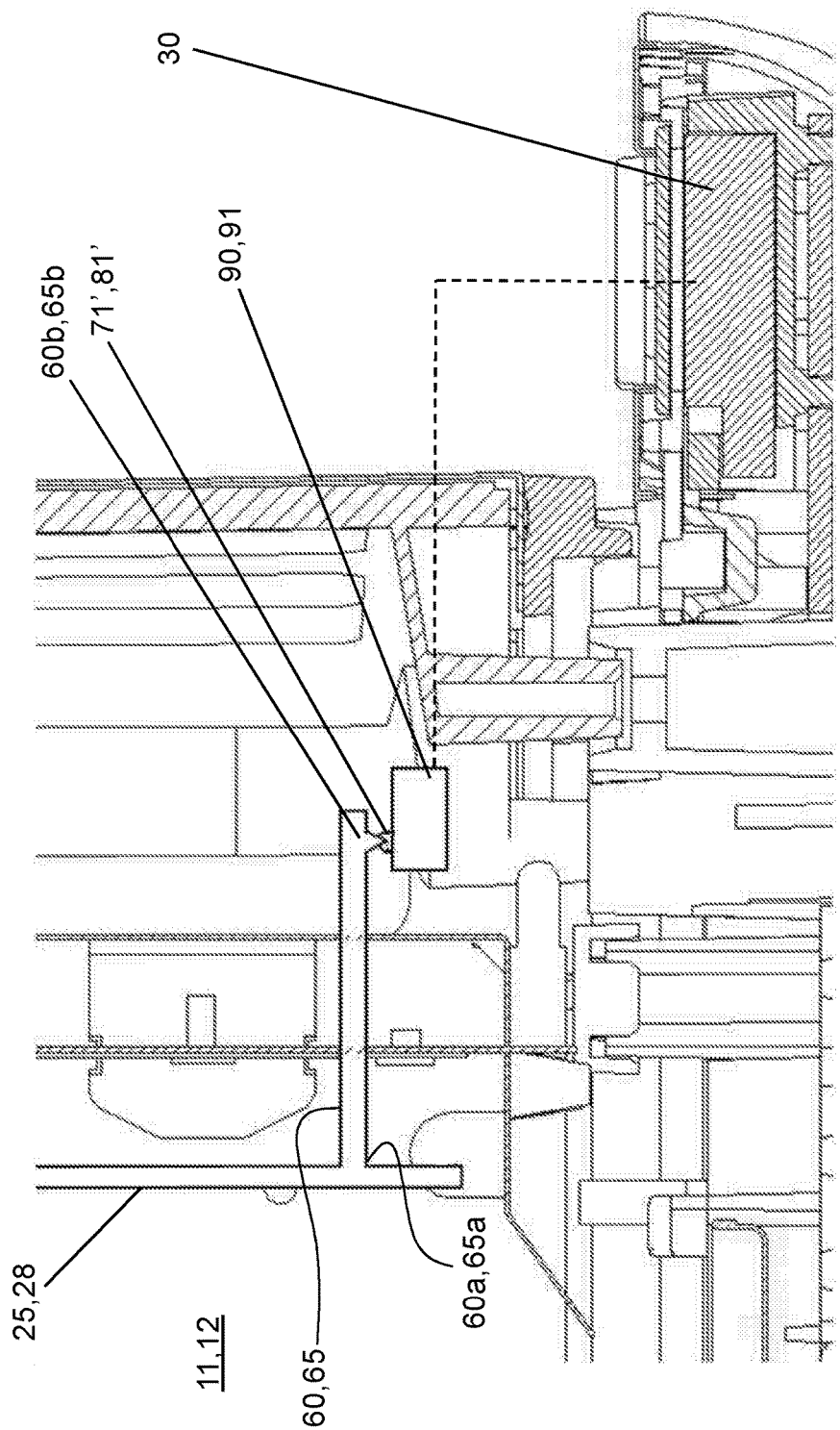
FIG. 3 schematically shows a sectional view of a portion of a second embodiment of a toaster in accordance with the present invention.

In a further embodiment (shown in FIG. 2), the detection device 70, 80 may be equipped with a sensing element 71, 81 that can be switched between a first and a second operating conditions.

The sensing element 71, 81 is in the first operating condition when it is not in contact with the second end 60b, 65b of the stem 60.

The sensing element 71, 81 is switched into the second operating condition when the second end 60b, 65b of the stem 60, 65 exerts a predetermined pressure on the sensing element 71, 81 itself.

In practice, the sensing element 71, 81 is normally separated from the second end 60b, 65b of the stem 60, 65, i.e. in the first operating condition.

When a particularly thick food, e.g. a toast or a sandwich, is inserted, the stem undergoes a translational movement (from left to right in FIG. 2), until the second end 60b, 65b of the stem 60, 65 abuts against the sensing element 71, 81, thus exerting some pressure on it and switching it into the second operating condition.

The sensing element 71, 81 can be implemented as some sort of electromechanical push-button that, depending on the pressure exerted on it, will cause either the generation or the interruption of a certain voltage/current.

When the sensing element 71, 81 is switched into the second operating condition, the detection device 70, 80 generates the detection signal DS1, DS2.

When the sensing element 71, 81 is switched into the second operating condition, the control unit 30 may act upon the at least one heating element 21-24 in order to execute a main heating program comprising a succession of activations separated by respective deactivations of said at least one heating element 21-24.

In other words, the main heating program can activate and deactivate the at least one heating element 21-24 multiple times, so that, given a certain total duration of the main heating program, the total on time of the at least one heating element 21-24 will be significantly shorter than said duration and will be distributed in a predetermined manner over the duration of the program.

When the heating compartment 11, 12 is associated with a pair of heating elements 21, 22; 23, 24, the succession of activations/deactivations in the main heating program may be imposed on both of such heating elements.

By way of example only, the main heating program may comprise a plurality of activations of the at least one heating element 21-24, each one having a duration of 40 seconds to 50 seconds, each pair of consecutive activations being separated by one deactivation having a duration of 10 seconds to 20 seconds. The total duration of the program may be, for example, comprised between 190 seconds and 260 seconds, during which the at least one heating element 21-24 is activated 4 times (i.e. it is activated for a total time between 160 seconds and 200 seconds).

When, on the contrary, the sensing element 71, 81 is in the first operating condition, the control unit 30 may act upon the at least one heating element 21-24 in order to execute a heating program in which the at least one heating element 21-24 is kept active for substantially the whole duration of the program.

In practice, when the sensing element 71, 81 is in the first operating condition, a traditional program is executed, the duration of which may be set by the user.

In a second operating condition, the detection device 70, 80 comprises a sensing element 71', 81' cooperating with the second end 60b, 65b of the stem 60, 65, so that the detection signal DS1, DS2 will vary as a function of the position of the second end 60b, 65b itself.

In particular, the sensing element 71', 81' is configured for detecting the position of the second end 60b, 65b with substantial spatial continuity within a predetermined stroke.

Said predetermined stroke is defined between two extreme positions that the second end 60b, 65b can take, respectively in the absence of food in the heating compartment or in the presence of a food 13, 14 of maximum thickness in the same compartment.

Preferably, the detection signal DS1, DS2 is representative of the position of the second end 60b, 65b within the predetermined stroke.

One possible practical implementation uses a sliding electric contact between the second end 60b, 65b and a support 90, 91 integral with the frame 2 of the toaster 1. As the position of the second end 60b, 65b changes, a corresponding variable electric signal is generated, which preferably defines the detection signal DS1, DS2.

The control unit 30 is configured for selecting, among a plurality of preset programs, one heating program to be executed as a function of the detection signal DS1, DS2.

In one possible embodiment, said plurality of programs comprise:

a. a first group of heating programs, in each one of which the at least one heating element 21-24 is activated with substantial continuity for the whole duration of the program;

b. a second group of heating programs, each one of which performs a plurality of activations, separated by respective deactivations, of the at least one heating element 21-24 during the execution of the program.

The following table shows some examples of programs belonging to the second group: the first and third columns show some exemplary durations of periods of activation of the at least one heating element 21-24; the second and fourth columns show some exemplary durations of the respective periods of deactivation of the at least one heating element 21-24; and the fifth column shows the total duration of each program.

| ON | OFF | ON | OFF | Total |
| --- | --- | --- | --- | --- |
| 55" | 30" | 55" | 30" | 2' 50" |
| 1' | 30" | 1' | 30" | 3' |
| 1' 10" | 30" | 1' 10" | 30" | 3' 20" |
| 1' 15" | 30" | 1' 15" | 30" | 3' 30" |
| 1' 20" | 32" | 1' 20" | 32" | 3' 44" |
| 1' 25" | 30" | 1' 25" | 30" | 3' 50" |

In an embodiment, the control unit 30 can be associated with a respective memory 31, which is logically and/or physically divided into two portions: the first portion stores the characteristic parameters of the programs of the first group (typically the time duration thereof), whereas the second portion stores the characteristic parameters of the programs of the second group (e.g.: heating element on/off times, number of activations/deactivations, etc.).

As a function of the detection signal DS1, DS2, it is thus possible to select the most appropriate program from the first or second memory portions.

When the detected thickness is greater than a predetermined threshold, programs of the second group may be selected. Instead, when the thickness is below said threshold, programs of the first group may be selected.

The above described toaster 1 may offer significant advantages.

First of all, the toaster can autonomously determine which is the most appropriate program to be used for heating the food positioned in the heating compartments, thereby optimizing the quality of the final product provided to the user.

In addition, by executing programs such as, for example, the above-mentioned main heating program or the above-mentioned programs of the second group, it may be possible to optimally heat both the outer surfaces and the innermost layers of the food inserted in the heating compartment.

This may significantly improve the quality of the food provided to the user.

Furthermore, the toaster according to the invention has a simple structure which can be manufactured easily and economically.

The invention claimed is:

1. A toaster comprising:
 a first heating compartment, in which a food to be heated is positionable;
 a first heating element associated with said first heating compartment and adapted to heat the food positioned in said at least one heating compartment; and
 a first detection assembly outputting:
  a first detection signal corresponding with the heating element operating according to a first active heating program when a thickness of the food is below a predetermined threshold; and
  a second detection signal corresponding with the heating element operating according to a second active heating program when the thickness of the food is above the predetermined threshold.

2. A toaster according to claim 1, further comprising a first positioning assembly acting upon the food in order to position the same in the first heating compartment.

3. A toaster according to claim 2, wherein the first detection assembly cooperates with the first positioning assembly in order to recognize that the thickness of the food is above the predetermined threshold.

4. A toaster according to claim 3, wherein the first detection assembly recognizes that the thickness of the food is above the predetermined threshold by a displacement of at least a portion of the first positioning assembly into contact with a portion of the detection assembly.

5. A toaster according to claim 2, wherein the first positioning assembly comprises a pair of grids respectively acting upon opposite sides of the food.

6. A toaster according to claim 5, wherein the detection assembly includes a stem having a first end constrained to a respective one of the pair of grids and a second end opposite to said first end and determines when the thickness of the food is above the predetermined threshold based on a displacement of said second end.

7. A toaster according to claim 6, wherein said detection assembly further includes an electromechanical button operable between a first operating condition including outputting the first detection signal and a second operating condition including outputting the second detection signal, the second end of the stem being moveable into and out of contact with the electromechanical button, said electromechanical button being in the first operating condition when it is not in contact with the second end of said stem, and said electromechanical button being switched into the second operating condition when the second end of said stem is in contact with said sensing element so as to exert a predetermined pressure thereon.

8. A toaster according to claim 7, wherein said detection assembly generates said detection signal by way of the electromechanical button when said electromechanical button is switched into the second operating condition.

9. A toaster according to claim 7, wherein the second heating program comprising a succession of activations separated by respective deactivations of said first heating element.

10. A toaster according to claim 7, wherein the first heating program is such that the heating element is maintained in an active condition for an entire duration of the program.

11. A toaster according to claim 6, wherein said detection assembly comprises an elongate contact cooperating with the second end of said stem with the second end in moving contact with the elongate contact throughout a range of motion of the stem, such that said detection signal varies as a function of a position of said second end relative to said elongate contact.

12. A toaster according to claim 10, wherein said sliding contact detects the position of said second end relative to said electromechanical button with spatial continuity throughout the predetermined range of motion of said second end.

13. A toaster according to claim 12, wherein said detection assembly outputs the first detection signal when the position of said second end is within a first sub-range within said predetermined range of motion and outputs the second detection signal when the position of said second end is within a second sub-range within said predetermined range of motion.

14. A toaster according to claim 1, wherein:
 when in the first heating program the first heating element is activated with substantial continuity for an entire duration of the program; and
 when in the second heating program a plurality of activations, separated by respective deactivations, of said first heating element are performed over the duration of the program.

15. A toaster according to claim 14, wherein:
 a plurality of first sub-programs operate according to the first heating program with each of the plurality of first sub-programs corresponding with a respective preset duration;
 each of the first sub programs subdivides the preset duration into a consistent number of the plurality of activations and deactivations.

16. A toaster comprising:
 a first heating compartment, in which a food to be heated is positionable;
 a first positioning grid acting upon the food in order to position the same in the first heating compartment;
 a first heating element associated with said at least one heating compartment and adapted to heat the food positioned in said at least one heating compartment; and
 a first detection assembly operable with the first positioning grid and outputting:

a first detection signal corresponding with the heating element operating according to a first active heating program when a thickness of the food is below a predetermined threshold;
a second detection signal corresponding with the heating element operating according to a second active heating program when the thickness of the food is above the predetermined threshold.

\* \* \* \* \*